United States Patent
Kollar

(10) Patent No.: US 12,466,082 B2
(45) Date of Patent: Nov. 11, 2025

(54) MOTION GUIDANCE AND NATURAL LANGUAGE COMMANDS BASED ROBOTIC SYSTEMS

(71) Applicant: Toyota Research Institute, Inc., Los Altos, CA (US)

(72) Inventor: Thomas Kollar, San Jose, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 17/840,070

(22) Filed: Jun. 14, 2022

(65) Prior Publication Data
US 2023/0398696 A1    Dec. 14, 2023

(51) Int. Cl.
| | | |
|---|---|---|
| B25J 13/00 | (2006.01) | |
| B25J 9/16 | (2006.01) | |
| B25J 11/00 | (2006.01) | |
| G06F 40/205 | (2020.01) | |

(52) U.S. Cl.
CPC ............. B25J 13/003 (2013.01); B25J 9/163 (2013.01); B25J 9/1664 (2013.01); B25J 11/008 (2013.01); G06F 40/205 (2020.01)

(58) Field of Classification Search
None
See application file for complete search history.

(56) References Cited

U.S. PATENT DOCUMENTS

| | | | | |
|---|---|---|---|---|
| 2016/0151918 | A1* | 6/2016 | Stoyanchev | B25J 13/003 704/9 |
| 2016/0154791 | A1* | 6/2016 | Cheng | G06F 40/40 704/9 |
| 2017/0169813 | A1* | 6/2017 | Suzuki | G10L 15/197 |

(Continued)

FOREIGN PATENT DOCUMENTS

| | | |
|---|---|---|
| CN | 107351058 A | 11/2017 |
| CN | 111950482 A | 11/2020 |

(Continued)

OTHER PUBLICATIONS

Earning actions from natural language instructions using an on-world embodied cognitive architecture (https://www.frontiersin.org/articles/10.3389/fnbot.2021.626380/full), May 13, 2021.

(Continued)

*Primary Examiner* — Truc M Do
(74) *Attorney, Agent, or Firm* — DINSMORE & SHOHL LLP

(57) ABSTRACT

A robotic system is contemplated. The robotic system comprises a robot comprising a camera, a microphone, memory, and a controller that is configured to receive a natural language command for performing an action within a real world environment, parse the natural language command, categorize the action as being associated with guidance for performing the action, receive the guidance for performing the action, the guidance including a motion applied to at least one portion of the robot within the real world environment for performing the action, and store, in the memory, the natural language command in correlation with the motion that is applied to the at least one portion of the robot.

18 Claims, 10 Drawing Sheets

(56) References Cited

U.S. PATENT DOCUMENTS

| | | | |
|---|---|---|---|
| 2017/0278514 A1* | 9/2017 | Mathias | G06F 16/35 |
| 2019/0077009 A1* | 3/2019 | Huang | B25J 11/0005 |
| 2021/0110822 A1* | 4/2021 | Pramanick | B25J 9/1661 |
| 2021/0232121 A1* | 7/2021 | Pramanick | G06F 40/30 |

FOREIGN PATENT DOCUMENTS

| | | |
|---|---|---|
| CN | 112809689 A | 5/2021 |
| CN | 112949758 A | 6/2021 |
| KR | 1020200134060 A | 12/2020 |
| WO | 2017000786 A1 | 1/2017 |

OTHER PUBLICATIONS

Teach your Robot new Tricks with NLP and Deep Learning (https://sstepput.medium.com/teach-your-robot-new-tricks-with-nlp-and-deeplearning-301c9a1f1c0c), Nov. 20, 2020.

* cited by examiner

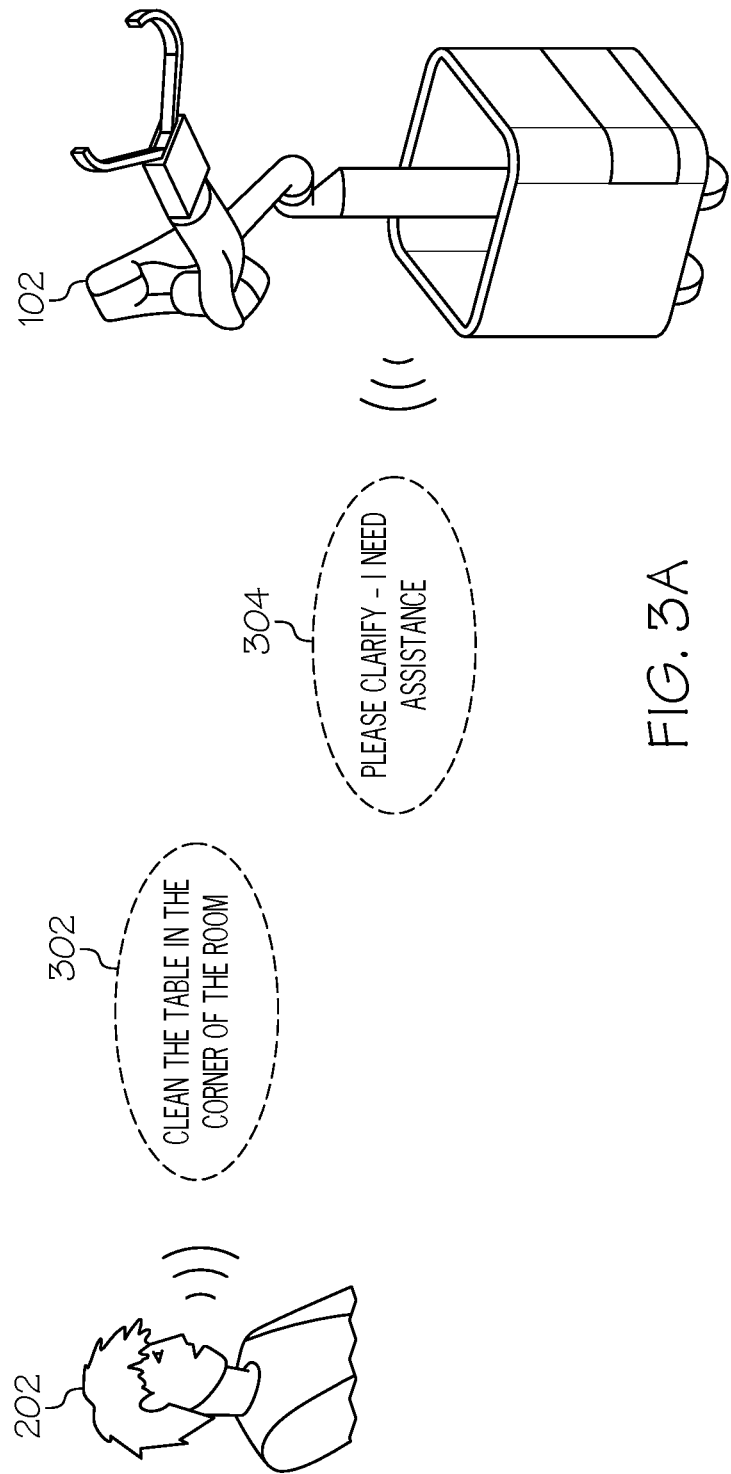

MOTION GUIDANCE AND NATURAL LANGUAGE COMMANDS BASED ROBOTIC SYSTEMS

TECHNICAL FIELD

The embodiments described herein generally relate to robotic systems, and more particularly, to robotic systems that categorize one or more actions in natural language commands as learned or engineering subroutines or actions requiring additional guidance. Depending on the categorization, the robotic system may either automatically instruct the robotic systems to perform various actions or receive and store one or more motions applied to one or more parts of the robot by a user. It is noted that the one or more motions that are applied may be stored in correlation with the natural language command that is categorized as an action requiring additional guidance.

BACKGROUND

Conventional robots may perform one or more tasks in response to receiving verbal instructions from operators. However, due to the different permutations and combinations of verbal instructions that may be spoken by operators and a level of ambiguity that may be present in these verbal instructions, robots may not be able to correctly perform these tasks. Additionally, verbal instructions may describe tasks that are highly complex, requiring task specific guidance from operators.

Accordingly, a need exists for a robotic system that enables robots to perform tasks or sequence of tasks accurately and efficiently.

SUMMARY

In one embodiment, a method for training a robot is provided. The method comprises receiving a natural language command for performing an action within a real world environment, parsing, by the computing device, the natural language command, categorizing the action as being associated with guidance for performing the action, receiving the guidance for performing the action, the guidance including a motion applied to at least one portion of the robot within the real world environment for performing the action, and storing the natural language command in correlation with the motion that is applied to the at least one portion of the robot.

In another embodiment, a robotic system is provided. The robotic system comprises a robot comprising a camera, a microphone, memory, and a controller. The controller is configured to receive a natural language command for performing an action within a real world environment, parse the natural language command, categorize the action as being associated with guidance for performing the action, receive the guidance for performing the action, the guidance including a motion applied to at least one portion of the robot within the real world environment for performing the action, and store, in the memory, the natural language command in correlation with the motion that is applied to the at least one portion of the robot.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A depicts an interaction between the operator and the robot as a result of which the robot enters a training mode, according to one or more embodiments described and illustrated herein;

DETAILED DESCRIPTION

Figure 1A:
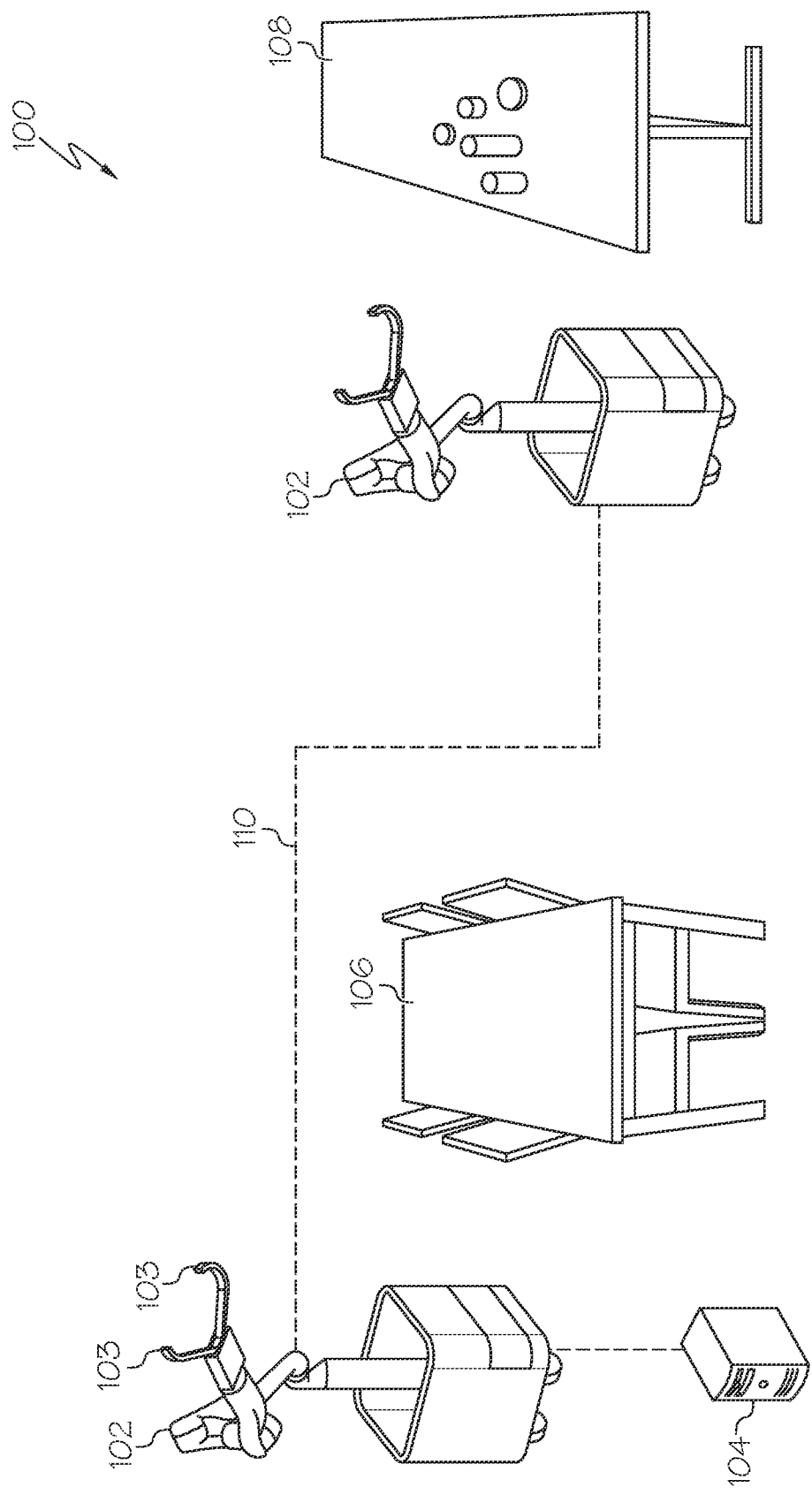
FIG. 1A depicts an example implementation of a robotic system as described in the present disclosure.

As stated above, while conventional robots and robotic systems may be able to perform some tasks in response to verbal commands from operators, the effectiveness with which these tasks are performed are limited by various factors. In particular, ambiguity in the verbal commands the complexity of certain tasks may prevent these robots from accurately performing various tasks.

The robotic system of the present disclosure addresses and overcomes these deficiencies. In particular, the robotic system of the present disclosure includes a plurality of components and features that enable the robotic system to perform tasks involving high levels of complexity, namely by analyzing natural language commands and correlating one or more actions included in these commands with external guidance received from operators. The external guidance may be in the form of specific motions applied to one or more parts of the robot. In operation, the robotic systems of the present disclosure may receive a natural language command from an operator, parse the terms included in the natural language command, and categorize one or more actions or tasks mentioned in the command as being associated with guidance. Upon categorizing one or more of the actions as being associated guidance, the robotic system may output a voice command requesting additional guidance, in response to which an operator may apply one or more motions directly on at least a portion of a robot. For example, in response to a voice command requesting additional guidance for completing a particular task, e.g., "clean the table in the corner of the room", the operator may transport the robot along a path in the room to the table positioned in the corner of the room, e.g., traversing the robot around obstacles, and move one or more parts of the robot to perform various actions, e.g., moving the arms the robot 102 over the surface area of the table to clean the table.

In embodiments, these guiding motions may be stored in memory of the robot in correlation with the actions or tasks specified in the natural language command. In embodiments, if the operate speaks a natural language command that is substantially similar or identical to "clean the table in the corner of the room" at a future date, the robot may access the guiding motions stored in correlation with the task of cleaning the table in the corner of the room and perform the task, without any additional guidance. In this way, the robot may be able to perform tasks of a high level of complexity with efficiency and accuracy. It is noted that the robot may also be preprogrammed to perform certain tasks without prior guidance from an operator. For example, basic tasks like picking up an object within a vicinity of the robot, performing a wiping operation, placing operation, grasping operation, and so forth, may be preprogrammed tasks that the robot is able to perform. In contrast, tasks like navigating within a room, sweeping the floor in a room, and so forth, may be tasks or actions associated with or requiring additional guidance.

Figure 5:
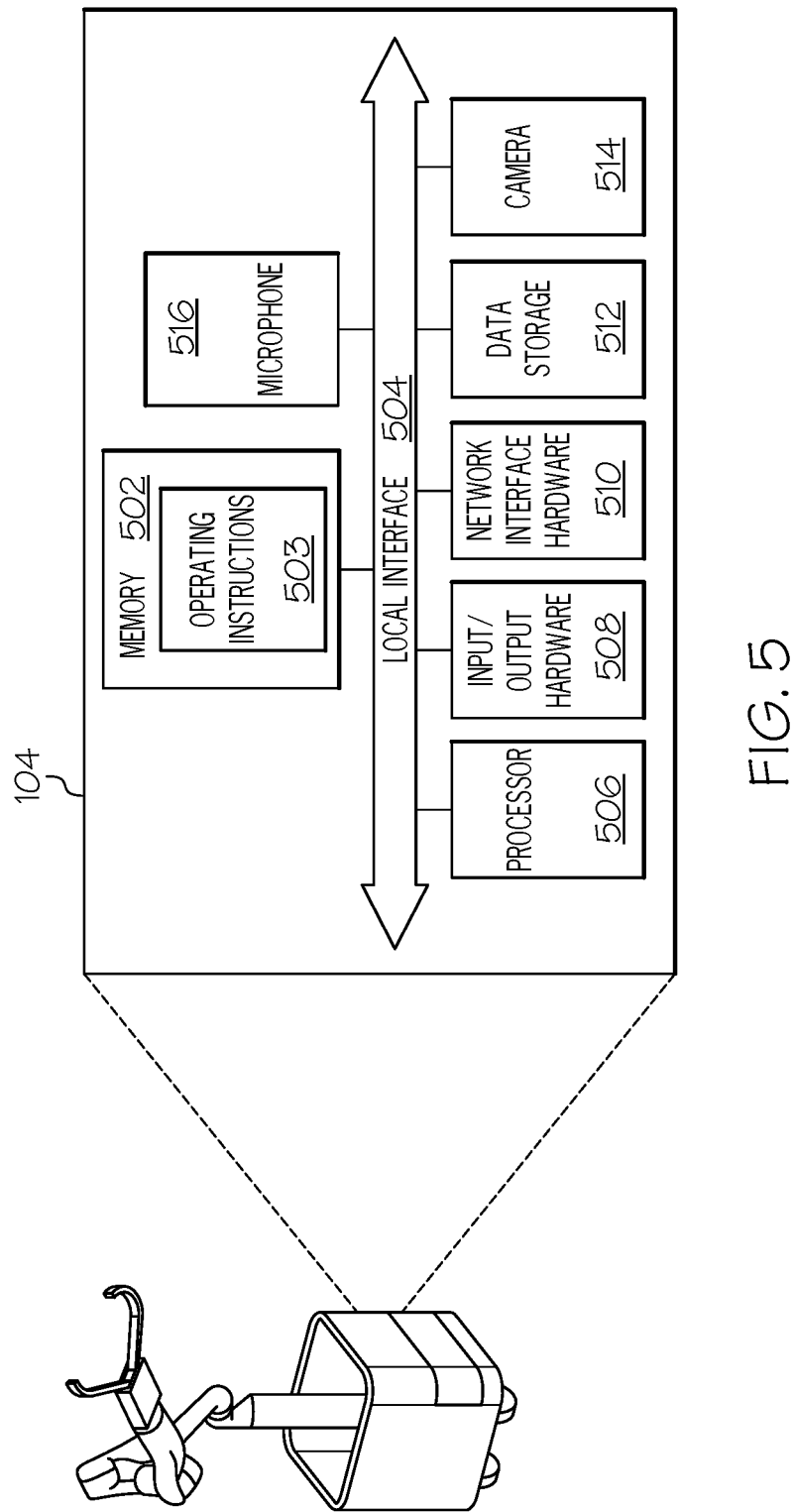
FIG. 5 depicts a non-limiting example of the controller that is configured to perform one or more of the features and functionalities described in the present disclosure, according to one or more embodiments described and illustrated herein.

FIG. 1A depicts an example implementation of a robotic system as described in the present disclosure. In embodiments, the robotic system 100 of FIG. 1A includes a robot 102 having an end effector 103 on an arm of the robot that may be configured to move away from and towards one another in order to grasp, move, rotate, and otherwise manipulate various external objects. In another embodiment, the robot 102 may be operated or controlled using a controller 104 (e.g., a computing device) and an actuator. The controller 104 may provide instructions to the actuator, based on which the actuator may operate to move the arm and the robot end effector 103, in addition to other parts of the robot 102 in order to perform various tasks within a real world environment, e.g., a residence of a user, an office of a user, and so forth. In embodiments, the robot 102 may also include a camera (i.e. camera 514 as described in detail below and illustrated in FIG. 5) and a microphone (i.e. microphone 516 as illustrated in FIG. 5). The actuator may be a motor such as, e.g., a Dynamixel XM540-W270-R motor.

In embodiments, it is noted that the end effector 103 on the arm of the robot 102 may be in the form of deformable grippers that include deformable sensors disposed thereon. The deformable sensors may be positioned within each of the deformable grippers and may be a camera or a comparable sensor that is capable of high spatial resolution. The deformable sensor positioned within each of the deformable grippers may be a dense tensile sensing sensor that provides the robot with a fine sense of touch, e.g., comparable to the touch associated with a human's fingers. The deformable sensor may also have a depth resolution for measuring movement towards and away from the sensor.

In embodiments, as illustrated in FIG. 1A, a user such as, e.g., an operator, an engineer, a technician, a consumer, and so forth, may speak a natural language command that may be captured by a microphone of the robot 102. For example, the user may speak a natural language command such as "clean the table in this room", "pick up the vase on the ground", and so forth. The natural language command may be received by the microphone of the robot 102, and in response, in embodiments, the robot 102 may perform the action specified in the natural language command, automatically and without user intervention. In other embodiments, upon receiving the natural language command, the robot 102 may output a voice command requesting clarification from the user, e.g., "Task not understood", "Please clarify, I need assistance", and so forth.

In embodiments, upon outputting a request for clarification, the robot 102 may enter a training mode, in which the robot 102 may store any motions applied to or on one or more portions of the robot 102, e.g., by an operator. For example, upon the request for clarification that is specific to a task such as "clean the table" is output by the robot 102, the user may directly manipulate or guide one or more parts of the robot 102 to perform certain motions. For example, the user may physically guide or move the robot 102 from a location near a door of a room to a corner of a room in which a table 108 is located. The navigation may include physically guiding the robot 102 around the dining table 106, along path 110. The physical guiding or moving of the robot 102 may occur by the user transmitting instructions wirelessly (or through a wired connection) to the controller 104, which may then control movement of the robot 102 from one location in the room to another. Alternatively, the user may physically contact the robot 102 and move the robot from one location in the room to another. Additionally, the user may also physical guide or move the end effector 103 on the arm of the robot 102 to perform the cleaning motion, which may include a wiping motion performed by the end effector 103 on the table 108. In embodiments, proximity sensors and contact sensors may be serve to detect contact that is made by the user in order to guide the end effector 103 to perform these actions, e.g., the cleaning action, the wiping motion, and so forth.

In embodiments, the controller 104 may store the motions applied to the robot 102 by the user, e.g., navigating or guiding the robot from one location in the room to another, performing a wiping motion using the end effector 103 on the table 108, and so forth, in correlation with the natural language command spoken by the user. In other words, the controller 104 may store the motions applied to the robot 102 by the user in correlation with the natural language command of "clean the table in this room". Consequently, in the future, if another natural language command is spoken by the user such as, e.g., "clean the table in the room", the robot 102 may, automatically and without user intervention, navigate from one location within the room to another location in which the table 108 is positioned and clean the table 108. In embodiments, the controller 104 may also be able to perform a sequence of tasks as specified in a particular natural language command spoken by the user, e.g., "pick up an object on the ground" and "clean the table".

Figure 1B:
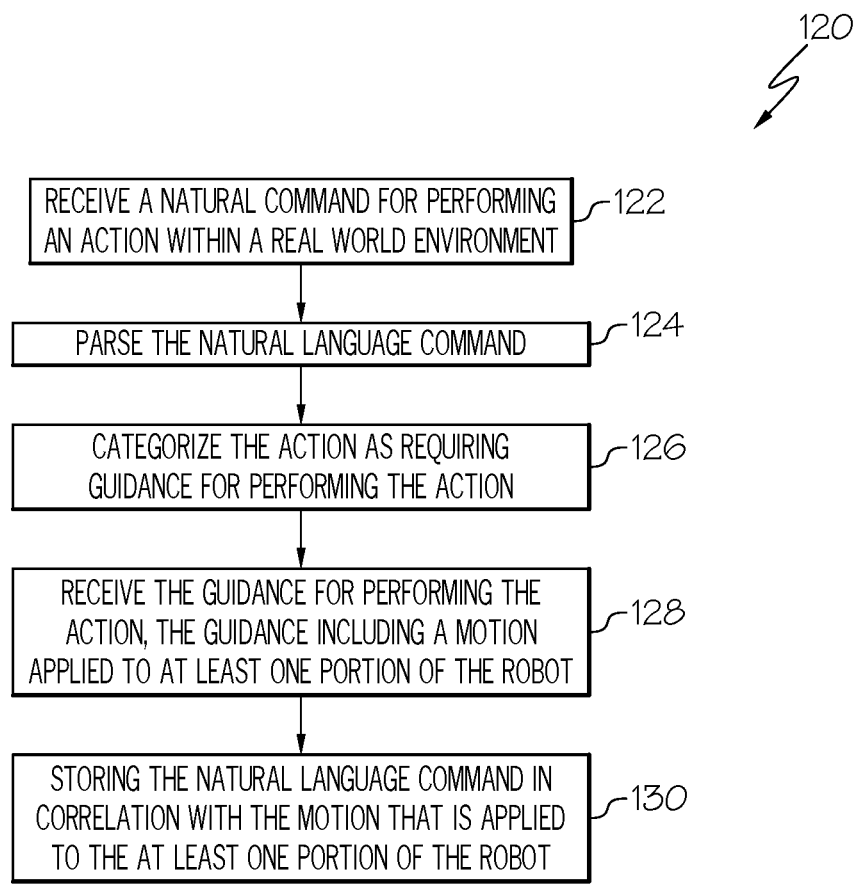
FIG. 1B depicts a flow chart of an example operation of the robot of the present disclosure, according to one or more embodiments described and illustrated herein.

FIG. 1B depicts a flow chart 120 of an example operation of the robot 102, according to one or more embodiments described and illustrated herein. In embodiments, at block 122, as described above, a natural command for performing an action within a real world environment may be received by the microphone of the robot 102. It is noted that multiple microphones may be installed on the robot 102 in order to accurately capture natural language commands spoken by the user.

In embodiments, at block 124, the natural language command may be parsed. In particular, the controller 104 may analyze the natural language command using one or more natural language speech recognition techniques and identify one or more specific actions or steps that the robot 102 may need to perform. For example, the controller 104 may parse the statement "pick up an object on the ground" by partitioning each of terms of "pick", "up", "object", "on", and "ground". The controller 104 may then identify a particular action or set of actions that may need to be performed by analyzing these terms.

In embodiments, at block 126, the action specified in the natural language command may be categorized as being associated with guidance for performing the action. For example, in embodiments, the controller 104 may parse the natural language command that is received, analyze the terms included in the natural language command, and determine that the action specified in the natural language command may be associated with additional guidance. For example, in embodiments, the controller 104 may analyze the natural language command of "clean the table in this room" as being associated with additional guidance because the robot 102 may be positioned in a particular area within the room and may not be able to navigate from that position to the location of the table. Additionally, the manner in which the table may need to be cleaned may not be clear.

For example, the controller 104 may not have a record of the actions that need to be taken to perform a cleaning operation, e.g., wiping operation. As such, in such situations, the controller 104 may categorize the action as being associated with additional guidance and output a voice message to the user indicating as much, e.g., "Please clarify task, I need assistance", or "Task unclear", and so forth. It is noted that, in such a scenario, the robot 102 may enter a training mode. Alternatively, in embodiments, if the actions in the natural language command are associated with particular steps that are stored in the memory (i.e., the memory 502 as illustrated in FIG. 5) of the controller 104, the robot 102 may, automatically and without user intervention, perform these steps.

For example, if the microphone of the robot 102 receives a natural language command such as, e.g., "pick up object from the ground in front of you", the robot 102 may categorize this task as an engineered subroutine (e.g., preprogrammed capability) and begin performing one or more actions, automatically and without user intervention. In embodiments, the robot 102 may bend an upper portion of the body of the robot 102 downwards, extend the end effector 103 a certain distance away from the body, and grasp one or more objects located within a particular vicinity of the robot, e.g., 1 meter, 2 meters, etc. In embodiments, prior to grasping the one or more objects on the ground, the camera positioned on the robot 102 may capture one or more images of one or more objects positioned on the ground within a particular vicinity of the robot 102, and the controller 104 may analyze these images and manipulate the end effector 103 to facilitate the grasping and pick up of the one or more objects.

In block 128, the robot 102 may receive guidance to perform the action, which was categorized in block 126 as being associated with additional guidance. In particular, the guidance may include a motion applied to at least a portion of the robot 102. As described above, if the natural language command is "clean the table in this room", which the controller 104 has categorized as being associated with additional guidance, the controller 104 may output from a speaker of the robot 102 that the task or action in the natural language command cannot be performed by the robot 102 and that the command may be associated with additional guidance. In response, as stated above, the user may apply one or more motions directly on one or more portions of the robot 102, e.g., physically transport or move the robot 102 along a path to the table, grasp the end effector of the robot 102, and move these end effector 103 over the perimeter of the table, thereby performing a cleaning motion. In block 130, the controller 104 will store the natural language command in correlation with the motion that is applied to the at least one portion of the robot. It is further noted that the robot 102 may include a combination of proximity sensors and contact sensors in addition to the camera. The proximity sensors and the contact sensors may be serve to detect contact that is made by the user in order to guide the end effector 103 to perform these actions, e.g., the cleaning action, the wiping motion, and so forth.

Figure 2A:
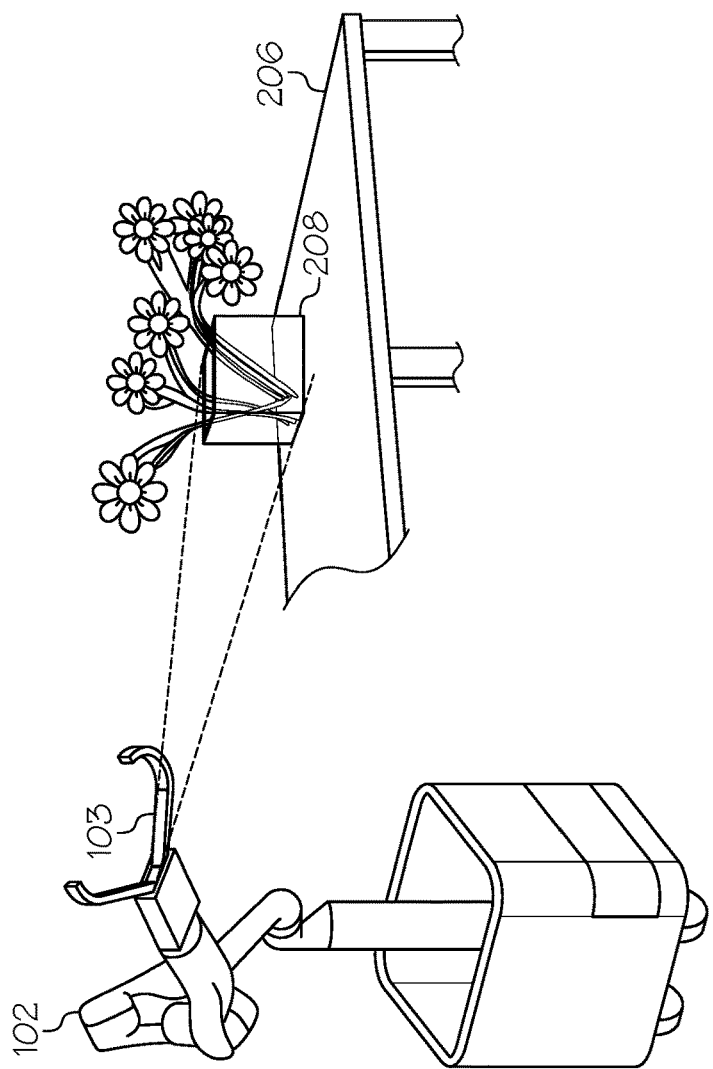
FIG. 2A depicts the robot performing an action associated with an engineered subroutine, according to one or more embodiments described and illustrated herein.
Figure 2A:

FIG. 2A depicts the robot 102 performing an action corresponding to an engineered subroutine, according to one or more embodiments described and illustrated herein. In particular, FIG. 2A describes an example operation in which an operator 202 outputs an example natural language command 203 such as "Pick up the Vase on the Table". In embodiments, the controller 104 may parse the example natural language command 203 and categorize the action included in the command as correlated to or associated with an engineered subroutine—one or more actions that the robot 102 is preprogrammed to perform. In other words, the controller 104, upon analyzing the terms in the natural language command 203, may determine that the robot 102 can perform the action included in the natural language command 203 without any additional guidance from the operator 202. As illustrated in FIG. 2A, in response to receiving the natural language command of "Pick up the Vase on the Table", the robot 102 may activate the camera, capture one or more images of a vase 208 position on the example table 206, analyze the images to identify the location of the vase 208 on the example table 206, and extend the end effector 103 towards the vase 208 and grasp it.

Figure 2B:
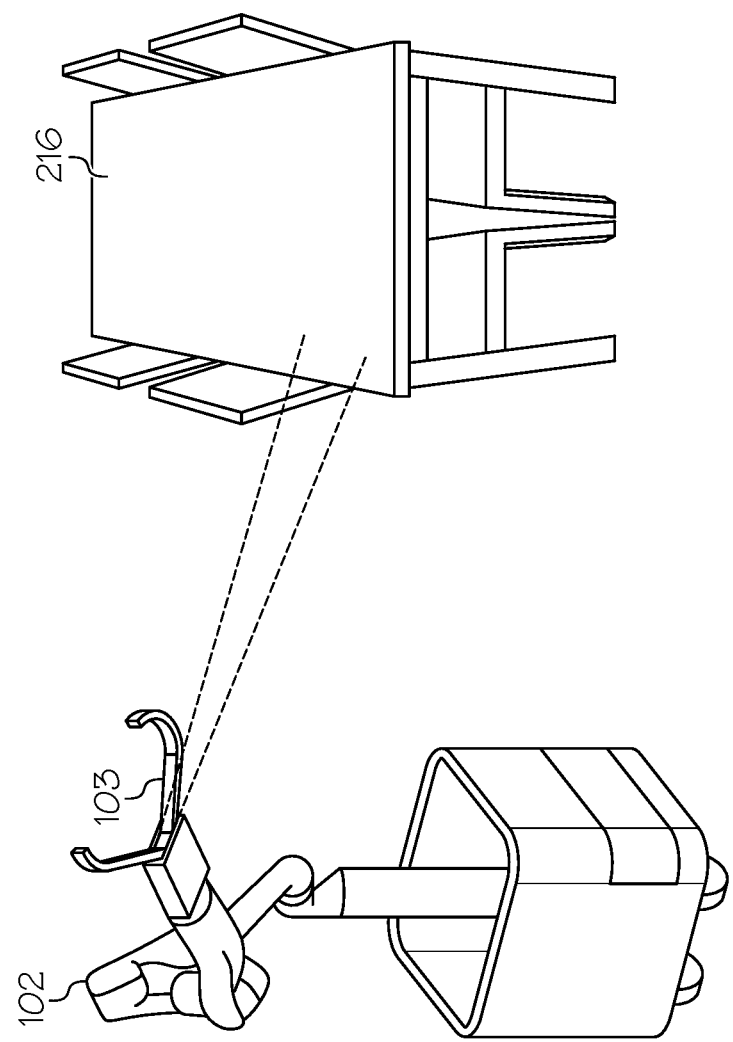
FIG. 2B depicts the robot performing another action corresponding to an engineered subroutine, according to one or more embodiments described and illustrated herein.
Figure 2B:

FIG. 2B depicts the robot 102 performing another action corresponding to an engineered subroutine, according to one or more embodiments described and illustrated herein. In particular, FIG. 2B depicts the operator 202 speaking a natural language command 214 such as, e.g., "Wipe the Table". In response, the controller 104 of the robot 102 may parse the natural language command 214 and categorize the action included in the command as correlated to or associated one or more actions that the robot 102 is preprogrammed to perform (i.e. an engineered subroutine). For example, in embodiments, the controller 104, upon receiving the command for wiping the table, may access instructions stored in memory (i.e. the memory 502 as illustrated in FIG. 5) of the robot 102 that are correlated with specific actions for wiping the table, and execute these instructions. Consequently, the robot 102 may, automatically and without user intervention, perform a wiping action on the example table 216. In embodiments, prior to performing the wiping action, the controller 104 may instruct the camera to take multiple images of the example table 216, and analyze these images to determine the dimensions of the example table 216, in addition to determining the distance between the robot 102 and the example table 216, and so forth. Based on such data, the controller 104 may facilitate the performing of the wiping action. It is further noted that FIG. 3A depicts an interaction between the operator 202 and the robot 102 as a result of which the robot 102 enters a training mode, according to one or more embodiments described and illustrated herein. In particular, in FIG. 3A, the operator 202 may speak an example natural language command 302 such as, e.g., "Clean the table in the corner of the room", which may be received by the microphone positioned on the robot 102. The controller 104 may parse the subject matter (e.g., individual terms) included in the command, analyze these terms, and categorize the action mentioned in these terms into a particular category, e.g., an engineered subroutine, a learned subroutine, or an action that may be associated with additional guidance. In embodiments, as illustrated in FIG. 3A, the controller 104 may determine that the task of cleaning the table in the corner of the room should be categorized as an action that is associated with additional guidance because, e.g., the robot 102 may not be aware of the location the table in the corner of the room, may not be trained to clean a table that is has objects present on it, and so forth. As such, in response to the example natural language command 302, the controller 104 may output an example voice command 304 indicating that the operator 202 must clarify his instructions and that the robot 102 needs assistance to complete the task included in the example natural language command 302.

Figure 3B:
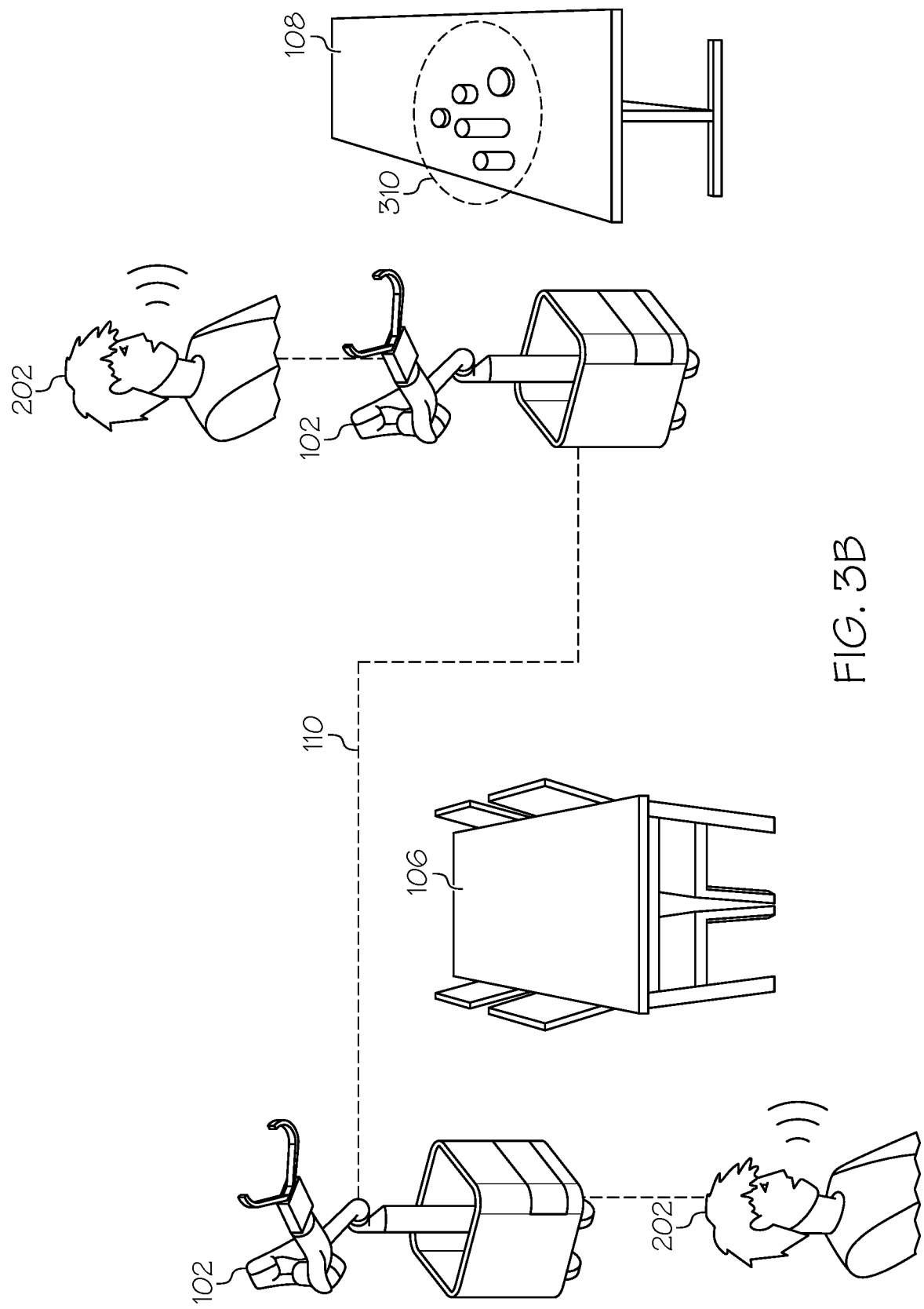
FIG. 3B depicts the operator providing guidance to the robot by applying a set of motions to the robot to facilitate completion of the task of cleaning a table in a corner of the room, according to one or more embodiments described and illustrated herein.

FIG. 3B depicts the operator 202 providing guidance to the robot 102 by applying a set of motions to the robot 102 to facilitate completion of the task of cleaning a table in a corner of the room, according to one or more embodiments described and illustrated herein. In embodiments, when the controller 104 outputs the example voice command 304 indicating the need to clarify the natural language command 302, the operator 202 may provide guidance by applying specific motions to one or more portions of the robot 102. In particular, the operator 202 may transport the robot 102 along the path 110, e.g., around the example dining table 106, and position the robot 102 within approximately a half foot from the example table 108. Additionally, the operator 202 may guide the end effector 103 such that the end effector 103 may grasp each of the objects 310 and move the objects 310 to a particular side of the example table 108 (e.g., the right side of the table). The operator 202 may further guide the end effector 103 such that the end effector 103 may perform a wiping action on the left side of the example table 108. Thereafter, the end effector 103 may be guided to move the objects 310 to the left side of the table, after which an additional wiping action may be performed on the right side of the example table 108.

During these tasks, the camera positioned on the robot 102 may be activated and a live stream of the guidance provided by the operator 202 may be captured. These images and the physical movements of one or more components of the robot 102 may be stored in the memory of the robot 102. It is further noted that, the example natural language command 302 may be stored in correlation with the motions or actions applied to one or more portions of the robot 102 in the memory of the robot. Additionally, in the future, if the operator 202 speaks the example natural language command 302 (i.e. "Clean the table in the corner of the room"), the robot 102 may, automatically and without user intervention, begin traveling along the path 110, stop in front of the example table 108, and clean the table 108 in the corner of the room, e.g., by moving objects positioned thereupon to one side of the table, cleaning the other side of the table, moving the objects to the other side of the table, and so forth, as described above.

Figure 4A:
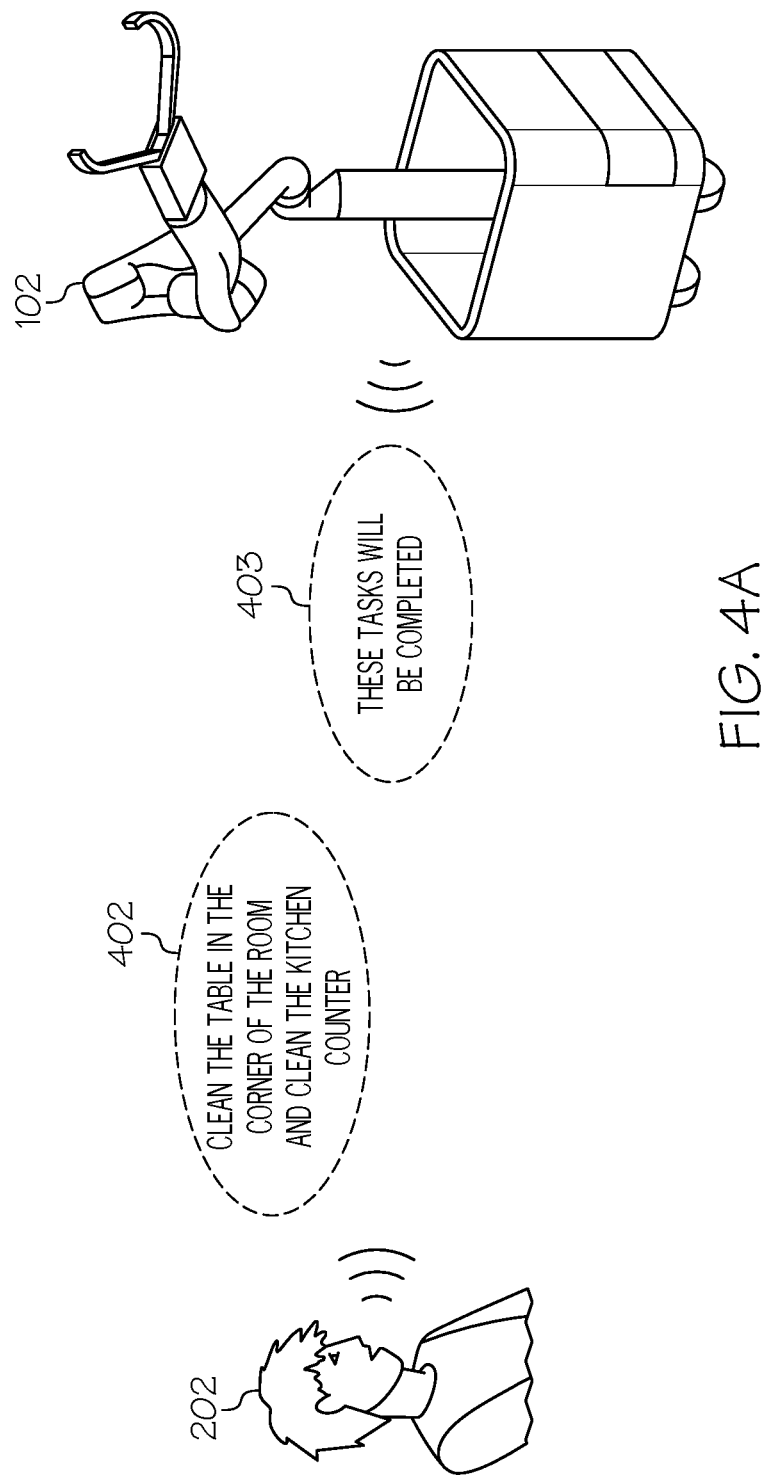
FIG. 4A depicts the operator outputting an example natural language command for performing a plurality of actions according to a sequence, according to one or more embodiments described and illustrated herein.

FIG. 4A depicts the operator 202 outputting an example natural language command for performing a plurality of actions according to a sequence, according to one or more embodiments described and illustrated herein. As illustrated in FIG. 4A, the operator 202 may speak an example natural language command 402 and specify a plurality of actions to be performed such as, e.g., "Clean the table in the corner of the room" and "clean the kitchen counter". Such a command may be received by the microphone of the robot 102 and analyzed by the controller 104, as described in detail above. In particular, the controller 104 may parse the terms of the example natural language command 402, categorize each of the plurality of actions included in the example natural language command 402 as, e.g., an engineering subroutine, a learned subroutine, or an action that is associated with or requires guidance. In embodiments, the actions of cleaning the table in the corner of the room and cleaning the kitchen counter may be categorized as learned subroutines. In other words, a natural language command may initially have been spoken and received by one or more speakers of the robot 102, and a particular sequence of actions may have been applied to one or more parts of the robot 102 by an operator. The particular sequence of applied actions may be stored in association with the natural language command such that, in a future instance, the operator may speak the natural language command and the robot 102 may automatically begin performing the particular sequence of actions that were previously applied and which are currently stored in correlation with the natural language command. It is further noted that, as described above, if either of the natural language commands of "Clean the table in the corner of the room" or "clean the kitchen counter" were actions requiring additional guidance, the robot 102 may output a request for additional guidance. In response, an operator or user may apply one or more motions directly onto one or more part of the robot 102, e.g., physically move the arm of the robot 102. Thereafter, the applied motions and the natural language command may be stored in correlation within one another in memory of the robot 102.

Returning to the example, based on the operator 202 previously applying various specific motions to at least a part of the robot 102, which in turn may be stored in correlation with the natural language command that is spoken by the operator 202. Subsequent to the categorizations, the controller 104 may access the learned subroutine stored in the memory of the robot 102, in which the example natural language command of "Clean the table in the corner of the room and clean the kitchen counter" may be stored, and initiate the performing of these motions automatically and without user intervention. In embodiments, however, upon receiving the example natural language command 402, the robot 102 may output a voice command 403 such as, e.g., "These tasks will be completed". It is noted that the learned subroutines stored in memory of the robot 102 may vary in complexity.

Figure 4B:
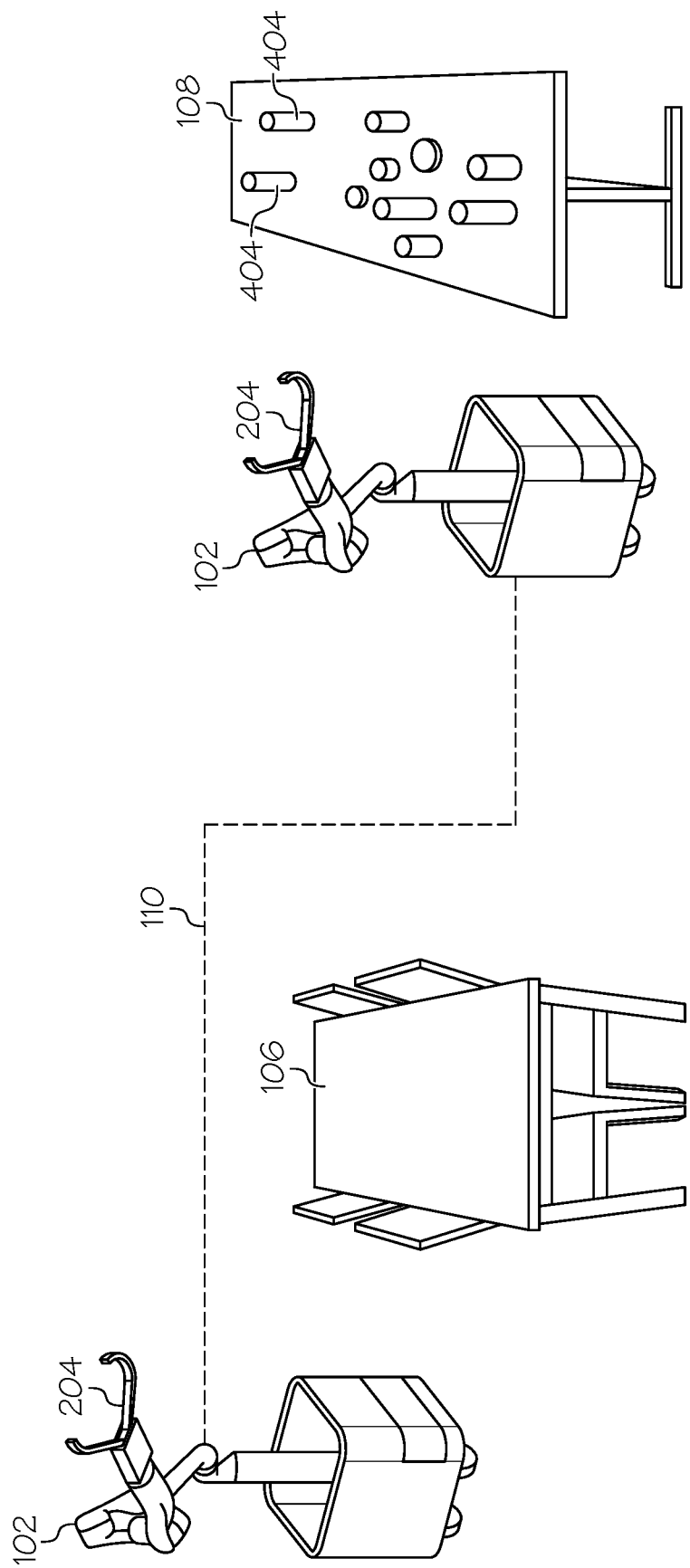
FIG. 4B depicts the robot performing the first of the actions in the sequence of actions included in the example natural language command of FIG. 4A, according to one or more embodiments described and illustrated herein.

FIG. 4B depicts the robot 102 performing the first of the actions in the sequence of actions included in the example natural language command 402 as illustrated in FIG. 4A, according to one or more embodiments described and illustrated herein. In particular, as illustrated in FIG. 4B, the robot 102 may perform the action of cleaning the table in the corner of the room based on the controller 104 accessing the memory of the robot and executing stored instructions corresponding to a learned subroutine. Based on one or more motions previously applied to at least a part of the robot 102, which are stored in the form of a learned subroutine, the robot 102 may, automatically and without user intervention, travel along the path 110 from a particular location in the room to the corner of the room in which the table 108 is located.

Additionally, in embodiments, upon reaching the table 108 in the corner of the room, the robot 102 may activate the camera positioned on the robot 102 and capture one or more images of external objects 404 positioned on the table 108. The robot 102 may then activate operation of the end effector 103 such that arm on which the end effector 103 is positioned may extend towards the external objects 404, grasp each of these external objects, and move these objects to a particular side of the table, e.g., the right side of the table 108. Thereafter, the end effector 103 may perform one or more wiping operations on the left side of the table 108. The end effector 103 may then move the external objects 404 from the right side of the table 108 to the left side of the table 108, and perform one or more wiping operations on the right side of the table 108. In this way, the robot 102 may, automatically and without user intervention, perform the action of cleaning the table 108 in the corner of the room.

Figure 4C:
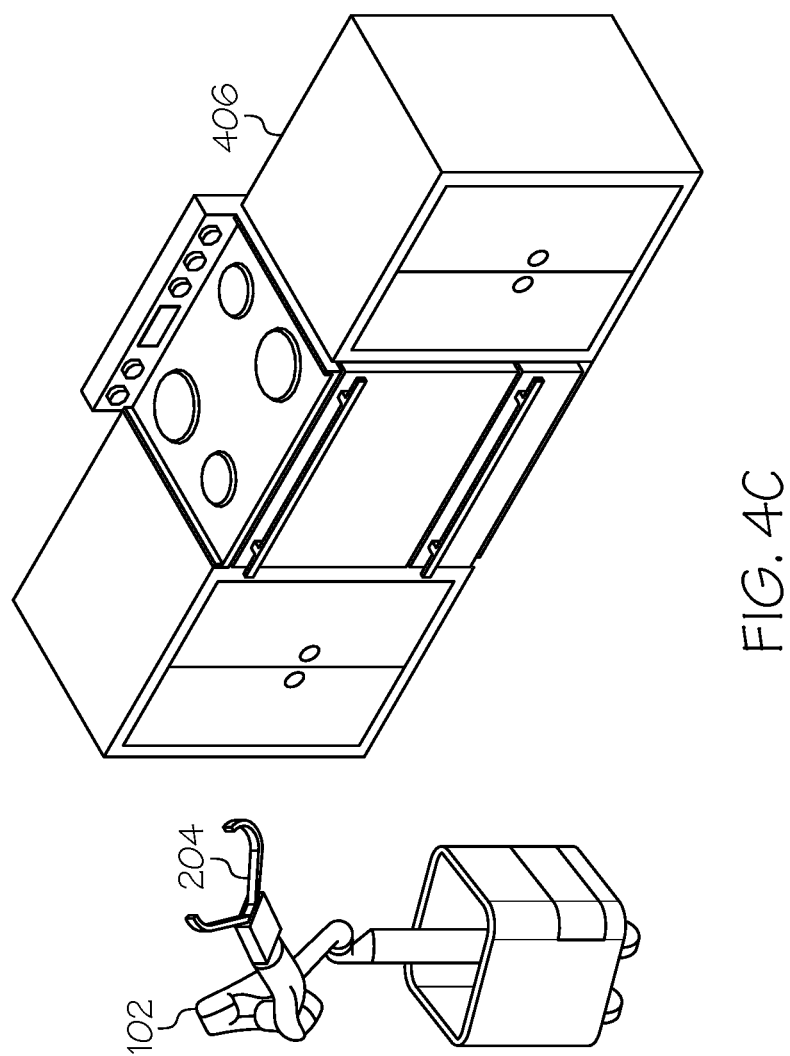
FIG. 4C depicts the robot performing the second of the actions in the sequence of actions included in the example natural language command as illustrated in FIG. 4A, according to one or more embodiments described and illustrated herein.

FIG. 4C depicts the robot 102 performing the second of the actions in the sequence of actions included in the example natural language command 402 as illustrated in FIG. 4A, according to one or more embodiments described and illustrated herein. In particular, the controller 104 of the robot 102 may access a learned subroutine corresponding to one or more motions previously applied by the operator 202 for guiding the robot 102 to perform the action of cleaning the kitchen counter. In particular, after accessing the learned subroutine stored in the memory of the robot 102, the controller 104 may execute instructions that will result in the robot 102, upon completing the action of cleaning the table 108, traveling to a kitchen counter 406 and performing one or more wiping operations. In this way, the robot 102 may, automatically and without user intervention, perform the action of cleaning the kitchen counter 406.

FIG. 5 depicts a non-limiting example of the controller 104 (a computing device) that is configured to perform one or more of the features and functionalities described in the present disclosure, according to one or more embodiments described and illustrated herein. As illustrated, the controller 104 includes a processor 506, input/output hardware 508, a network interface hardware 510, a data storage component 512, memory 502, a microphone 516, and a camera 514. The memory 502 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device and/or a device that is external to the controller 104.

The memory 502 may store operating instructions 503, each of which may be embodied as a computer program, firmware, and so forth. The memory 602 may comprise RAM, ROM, flash memories, hard drives, or any device capable of storing the operating instructions 503 such that the operating instructions 503 can be accessed by the processor 506. The operating instructions 503 may comprise logic or algorithm(s) written in any programming language of any generation (e.g., 1GL, 2GL, 3GL, 4GL, or 5GL) such as, for example, machine language that may be directly executed by the controller 104, or assembly language, object-oriented programming (OOP), scripting languages, microcode, etc., that may be compiled or assembled into machine readable and executable instructions and stored on the memory 502. Alternatively, the operating instructions 503 may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The processor 506 along with the memory 602 may operate as a controller for the controller 104.

A local interface 504 is also included in FIG. 1 and may be implemented as a bus or other communication interface to facilitate communication among the components of the controller 104. The processor 506 may include any processing component operable to receive and execute operating instructions 503 from the memory 502 (such as from a data storage component 512 and/or the memory 502). Accordingly, the processor 506 may be an integrated circuit, a microchip, a computer, or any other computing device. As described above, the input/output hardware 508 may include and/or be configured to interface with speakers, microphones, and/or other input/output components.

The operating instructions 503 may include an operating system and/or other software for managing components of the controller 104. It should be understood that while the component in FIG. 1 are illustrated as residing within the controller 104, this is merely an example. In some embodiments, one or more of the components may reside external to the controller 104 or within other devices. It should be understood that, while the controller 104 is illustrated as a single device, this is also merely an example. As an example, one or more of the functionalities and/or components described herein may be provided by the controller 104. Depending on the particular embodiments, any of these devices may have similar components as those depicted in FIG. 1. To this end, any of these devices may include instructions for performing the functionality described herein.

The camera 514 may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. The camera 514 may have a broad angle feature that enables capturing digital content within a 150 degree to 180 degree arc range. Alternatively, the camera 514 may have a narrow angle feature that enables capturing digital content within a narrow arc range, e.g., degree to 90 degree arc range. In embodiments, the camera 514 may be capable of capturing standard or high definition images in a 720 pixel resolution, a 1080 pixel resolution, and so forth. Alternatively or additionally, the camera 514 may have the functionality to capture a continuous real time video stream for a predetermined time period.

It should now be understood that the embodiments of the present disclosure are directed to a method for training and operating a robot. The method comprises receiving a natural language command for performing an action within a real world environment, parsing, by the computing device, the natural language command, categorizing the action as being associated with guidance for performing the action, receiving the guidance for performing the action, the guidance including a motion applied to at least one portion of the robot within the real world environment for performing the action, and storing the natural language command in correlation with the motion that is applied to the at least one portion of the robot. It should now be understood that the embodiments of the present disclosure are also directed to a robotic system that comprises a robot comprising a camera, a microphone, memory, and a controller. The controller is configured to receive a natural language command for performing an action within a real world environment, parse the natural language command, categorize the action as being associated with guidance for performing the action, receive the guidance for performing the action, the guidance including a motion applied to at least one portion of the robot within the real world environment for performing the action, and store, in the memory, the natural language command in correlation with the motion that is applied to the at least one portion of the robot.

In a first aspect, a method implemented by a computing device of a robot comprises receiving a natural language command for performing an action within a real world environment, parsing, by the computing device, the natural language command, categorizing the action as being associated with guidance for performing the action, receiving the guidance for performing the action, the guidance including a motion applied to at least one portion of the robot within the real world environment for performing the action, and storing the natural language command in correlation with the motion in memory of the computing device.

In a second aspect, the method of the first aspect, further comprising entering a training mode upon categorizing the action as being associated with the guidance for performing the action.

In a third aspect, the method of the first aspect or the second aspect, further comprising receiving an additional natural language command for performing the action within the real world environment, parsing, by the computing device, the additional natural language command, and categorizing the action in the additional natural language command as a learned subroutine.

In a fourth aspect, the method of the third aspect, wherein the learned subroutine is at least one of a navigation operation or a cleaning operation.

In a fifth aspect, the method of the third aspect, further comprising automatically performing the action within the real world environment independent of the guidance.

In a sixth aspect, the method of any of the first to the fifth aspects, further comprising receiving an additional natural language command for performing an additional action within the real world environment, and categorizing the additional action as an engineered subroutine based on preprogrammed capabilities specific to the robot.

In a seventh aspect, the method of the sixth aspect, wherein the engineered subroutine is at least one of a grasping operation, a placing operation, a wiping operation, or a tool change operation.

In an eighth aspect, the method of the seventh aspect, wherein the engineered subroutine is at least one of a grasping operation, a placing operation, a wiping operation, or a tool change operation.

In a ninth aspect, the method of the first to the ninth aspects, further comprising receiving an additional natural language command for performing a plurality of actions according to a sequence, the sequence including a first action that is an engineered subroutine task and a second action that is a learned subroutine.

In a tenth aspect, the method of the ninth aspect, further comprising automatically performing each of the plurality of actions according to the sequence.

In an eleventh aspect, the method of the sixth aspect, wherein the engineered subroutine includes one or more of identifying dimensions of objects within the real world environment and moving one or more of these objects within a predefined range of the robot.

In a twelfth aspect, a robotic system comprises a robot that comprises a camera, a microphone, memory, a controller that is configured to: receive a natural language command for performing an action within a real world environment, parse the natural language command, categorize the action as being associated with guidance for performing the action, receive the guidance for performing the action, the guidance including a motion applied to at least one portion of the robot within the real world environment for performing the action, and store the natural language command in correlation with the motion in the memory.

In a thirteenth aspect, the robotic system of the twelfth aspect, wherein the controller is further configured to enter a training mode upon categorizing the action as being associated with the guidance for performing the action.

In a fourteenth aspect, the robotic system of the twelfth aspect or the thirteenth aspect, wherein the controller is further configured to receive an additional natural language command for performing the action within the real world environment, parse the additional natural language command; and categorize the action in the additional natural language command as a learned subroutine.

In a fifteenth aspect, the robotic system of the fourteenth aspect, wherein the controller is further configured to receive an additional natural language command for performing the action within the real world environment, parse the additional natural language command, and categorize the action in the additional natural language command as a learned subroutine.

In a sixteenth aspect, the robotic system of the fourteenth aspect, wherein the controller is further configured to automatically perform the action within the real world environment independent of the guidance.

In a seventeenth aspect, the robotic system of the twelfth aspect, wherein the controller is further configured to receive an additional natural language command for performing an additional action within the real world environment, and categorize the additional action as an engineered subroutine based on preprogrammed capabilities specific to the robot.

In an eighteenth aspect, the robotic system of the seventeenth aspect, wherein the engineered subroutine is at least one of a grasping operation, a placing operation, a wiping operation, or a tool change operation.

In a nineteenth aspect, the robotic system of any of the twelfth to the eighteenth aspects, wherein the controller is further configured to receive an additional natural language command for performing a plurality of actions according to a sequence, the sequence including a first task that is an engineered subroutine and a second task that is a learned subroutine.

In a twentieth aspect, the robotic system of the nineteenth aspect, wherein the controller is further configured to automatically perform each of the plurality of actions according to the sequence.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method implemented by a computing device of a robot, the method comprising:
   receiving a natural language command for performing an action within a real world environment, the natural language command including one or more terms;
   parsing, by the computing device, the natural language command by analyzing the one or more terms of the natural language command to identify the action;
   categorizing the action as being associated with guidance for performing the action;
   receiving the guidance for performing the action, the guidance including a motion applied to at least one portion of the robot within the real world environment for performing the action;
   storing the natural language command in correlation with the motion in memory of the computing device;
   receiving a future natural language command at a time point subsequent to the natural language command and accessing the memory to determine a degree of similarity relative to the stored natural language command in correlation with the motion to perform the action associated with the future natural language command;
   outputting a voice command indicating a request for clarification of the natural language command, wherein the voice command is outputted in response to determining an absence of a record of the action in the memory of the computing device to be performed in correlation with the motion;
   entering, by the robot and in response to putting the voice command indication the request for clarification of the natural language command, a training mode including storing the motion applied to the at least one portion of the robot; and
   performing, in response to the robot entering the training mode, the action specified in the natural language command stored in the memory of the computing device automatically and without user intervention.

2. The method of claim 1, further comprising:
   receiving an additional natural language command for performing the action within the real world environment;
   parsing, by the computing device, the additional natural language command; and
   categorizing the action in the additional natural language command as a learned subroutine.

3. The method of claim 2, wherein the learned subroutine is at least one of a navigation operation or a cleaning operation.

4. The method of claim 2, further comprising automatically performing the action within the real world environment independent of the guidance.

5. The method of claim 1, further comprising:
   receiving an additional natural language command for performing an additional action within the real world environment; and
   categorizing the additional action as an engineered subroutine based on preprogrammed capabilities specific to the robot.

6. The method of claim 5, further comprising automatically performing the additional action within the real world environment responsive to categorizing the additional action as the engineered subroutine.

7. The method of claim 6, wherein the engineered subroutine is at least one of a grasping operation, a placing operation, a wiping operation, or a tool change operation.

8. The method of claim 1, further comprising receiving an additional natural language command for performing a plurality of actions according to a sequence, the sequence including a first action that is an engineered subroutine task and a second action that is a learned subroutine, wherein the second action is performed with additional guidance.

9. The method of claim 8, further comprising automatically performing each of the plurality of actions according to the sequence.

10. The method of claim 5, wherein the engineered subroutine includes one or more of identifying dimensions of objects within the real world environment and moving one or more of these objects within a predefined range of the robot.

11. A robotic system comprising:
    a robot comprising:
    a camera;
    a microphone;
    memory; and
    a controller that is configured to:
    receive a natural language command for performing an action within a real world environment, the natural language command including one or more terms,
    parse the natural language command by analyzing the one or more terms of the natural language command to identify the action,
    categorize the action as being associated with guidance for performing the action,
    receive the guidance for performing the action, the guidance including a motion applied to at least one portion of the robot within the real world environment for performing the action,
    store the natural language command in correlation with the motion in the memory,
    receive a future natural language command at a time point subsequent to the natural language command and access the memory to determine a degree of similarity relative to the stored natural language command in correlation with the motion to perform the action associated with the future natural language command,
    output a voice command indicating a request for clarification of the natural language command, wherein the voice command is outputted in response to determining an absence of a record of the action in the memory to be performed in correlation with the motion;

enter, by the robot and in response to putting the voice command indication the request for clarification of the natural language command, a training mode including storing the motion applied to the at least one portion of the robot; and perform, in response to the robot entering the training mode, the action specified in the natural language command stored in the memory automatically and without user intervention.

12. The robotic system of claim 11, wherein the controller is further configured to:

receive an additional natural language command for performing the action within the real world environment;

parse the additional natural language command; and categorize the action in the additional natural language command as a learned subroutine.

13. The robotic system of claim 12, wherein the learned subroutine is at least one of a navigation operation or a cleaning operation.

14. The robotic system of claim 12, wherein the controller is further configured to automatically perform the action within the real world environment independent of the guidance.

15. The robotic system of claim 11, wherein the controller is further configured to:

receive an additional natural language command for performing an additional action within the real world environment; and categorize the additional action as an engineered subroutine based on preprogrammed capabilities specific to the robot.

16. The robotic system of claim 15, wherein the engineered subroutine is at least one of a grasping operation, a placing operation, a wiping operation, or a tool change operation.

17. The robotic system of claim 11, wherein the controller is further configured to:

receive an additional natural language command for performing a plurality of actions according to a sequence, the sequence including a first task that is an engineered subroutine and a second task that is a learned subroutine, wherein the second task is performed with additional guidance.

18. The robotic system of claim 17, wherein the controller is further configured to automatically perform each of the plurality of actions according to the sequence.

* * * * *